United States Patent Office 2,875,178
Patented Feb. 24, 1959

2,875,178

COPOLYMER POLYHYDRIC PHENOL RESIN

Frank P. Greenspan, Buffalo, and Rupert E. Light, Jr., Kenmore, N. Y., assignors to Food Machinery and Chemical Corporation, San Jose, Calif.

No Drawing. Application June 13, 1956
Serial No. 591,020

13 Claims. (Cl. 260—47)

This invention relates to compositions useful in the preparation of synthetic, thermoset resinous products and to these products, and particularly to thermoset castings, moldings, coatings, and the like derived from modified conjugated diene copolymers.

Because of their ready availability and their physical properties, the conjugated diene copolymers are potentially useful raw materials for the production of thermoset synthetic resinous products. These conjugated diene copolymers are the copolymers of conjugated dienes such as butadiene, the various substituted butadienes, for example isoprene, and the like with ethylene monomers containing the $CH_2=CH-$ group. Although it is possible to use these copolymers directly for making coatings, these coatings are not entirely satisfactory, usually showing lack of adhesion and lack of toughness. Particularly difficult is the production of useful castings from conjugated diene copolymers.

It has been found in accordance with the present invention that a conjugated diene copolymer can be modified by reaction with a lower aliphatic peracid to produce a stable, complex, thermoplastic reaction product having reactive epoxy and hydroxy groups and acyloxy groups, and subsequently converted to thermoset condition by reaction with a polyhydroxy phenol. The composition of the present invention, from which the thermoset resinous product is derived, comprises a mixture of the thermoplastic reaction product with a polyhydroxy phenol.

The composition and thermoset resinous product of this invention are prepared by a series of steps which will be more fully discussed individually hereinafter. In principle, a conjugated diene copolymer first is treated with a lower aliphatic peracid having 1 to 10 carbon atoms. The product of this reaction normally contains reactive epoxy and hydroxy groups and acyloxy groups. However, although it contains highly reactive functional groups, the reaction product is thermoplastic and can be stored for extended periods without losing this thermoplasticity. At some time following its preparation the thermoplastic reaction product is blended with a polyhydroxy phenol and the resulting mixture is employed in the production of thermoset resinous products. This last treatment is carried out under conditions which are directly suitable for the production of castings, coatings and the like. If it be desired to produce a casting, the reaction product resulting from treating a conjugated diene copolymer with a lower aliphatic peracid is mixed with a suitable polyhydroxy phenol and the mixture is poured into a mold. The mixture in the mold then is heated and thereby caused to set to a casting having properties ranging from rubbery to hard and tough, depending on the particular conjugated diene copolymer-lower aliphatic peracid reaction product and polyhydric phenol employed.

If it be desired to form a coating, the product obtained by treating a conjugated diene copolymer with a lower aliphatic peracid is mixed in solvent solution with a suitable polyhydroxy phenol and this solvent mixture then applied to the surface to be coated and the coating heated. Upon evaporation of the solvent and reaction of the residue, an adherent coating having properties ranging from rubbery to hard and tough, and determined by the choice of conjugated diene copolymer-lower aliphatic peracid reaction product and polyhydric phenol, is obtained.

Conjugated diene copolymers generally can be used as the raw material in the process of this invention. Copolymers of this type are formed from conjugated dienes such as butadiene, the various substituted butadienes, for example isoprene, and the like with ethylene monomers containing the $CH_2=CH-$ group. Small amounts of other unsaturated materials may be used in formation of the copolymer. Examples of suitable ethylene monomers are styrene, acrylonitrile, isobutylene, methylstyrene and vinyl chloride. Other conjugated dienes and ethylene monomers will suggest themselves to the chemist.

Production of useful conjugated diene copolymer-lower aliphatic peracid reaction products in the sense of this invention requires a starting material of a certain minimum chain length, i. e. degree of polymerization. No theoretical upper limit exists for the chain length of the unsaturated starting material to be oxidized in accordance with this invention. However, there are certain practical considerations which impose a limit on the degree of polymerization of the starting material. Because the reaction of the conjugated diene copolymer with a lower aliphatic peracid has to be carried out in the liquid phase, the starting material must either be a liquid or must be soluble in a suitable reaction medium. Many highly polymerized compounds are solids of little or no solubility in otherwise useful solvents and in this respect, a practical upper limit is imposed on the degree of polymerization of the starting material. In other words, the practical requirement imposed by the need of working in the liquid phase limits the choice of starting material. However, the degree of polymerization of the starting material will also have to be considered in connection with the properties desired in the reaction products. A highly polymerized starting material will produce a reaction product of somewhat different properties than would be obtained by the use of a starting material of a lower degree of polymerization.

The physical state of the conjugated diene copolymer is determined by its degree of polymerization and molecular weight. Any liquid or properly soluble conjugated diene copolymer may be used. Generally speaking, however, conjugated diene copolymers having the requisite solubility will have a molecular weight no higher than about 250,000. Preferably the molecular weight of the conjugated diene copolymer should be in the range of about 250 to 10,000.

The conjugated diene copolymer can be polymerized by any known method, for example emulsion, solution or bulk polymerization. However, it is preferred to employ a conjugated diene copolymer polymerized in solution in the presence of a catalytic amount of finely divided sodium. Conjugated diene copolymers having molecular weights in the preferred molecular weight range can be prepared readily by this method, and these products can be reproduced without difficulty.

The reaction of the conjugated diene copolymer is carried out in accordance with this invention by treating it with a lower aliphatic peracid. Suitable peracids are the aliphatic peracids having 1 to 10 carbon atoms. The reaction may be carried out using a preformed peracid or the peracid may be formed from its constituents during the reaction and in the reaction medium. In either case the reaction should be carried out under conditions favoring the protection of epoxy groups formed, for example in the case of the preformed peracid reaction, the reaction should be run at moderate temperatures, e. g. below about 75° C., and for only a few hours.

When reacting the conjugated diene copolymer with the lower aliphatic peracid, stoichiometric amounts of the peracid or amounts below that theoretically required completely to react with the double bonds present in the conjugated diene copolymer may be used. It is important, however, that the reaction product contain at least about 1% of oxirane oxygen in order that it will be highly reactive with the polyhydric phenol in forming thermoset products. In the following examples, conjugated diene copolymers treated with the stoichiometric amount of lower aliphatic peracid will be designated as "100% reacted," and their oxirane oxygen contents given. Conjugated diene copolymers reacted with reduced amounts of peracid will be designated by a percent figure to indicate what might be termed the degree of reaction in terms of the fraction of the theoretical amount of peracid used, and their oxirane oxygen contents likewise will be given. The reactivity and resin forming properties of the conjugated diene copolymer-lower aliphatic peracid reaction product will obviously vary with its degree of reaction with the lower aliphatic peracid, and with the amount of highly reactive oxirane oxygen which it contains. Generally speaking, a 100% reacted conjugated diene copolymer having a high oxirane oxygen content will be more reactive with the herein polyhydroxy phenols and will more readily form a casting or coating than will a conjugated diene copolymer reacted to a lesser extent. At the same time the properties of the finished casting or coating will also be influenced to an extent by the degree of the reaction of the conjugated diene copolymer.

As indicated above, the conjugated diene copolymer-lower aliphatic peracid reaction product is treated at some time subsequent to its preparation, with a polyhydroxy phenol. Suitable polyhydroxy phenols include resorcinol, catechol, hydroquinone, 4,4'-dihydroxy diphenyl sulfone, and the alkyl bisphenols such as 4,4'-dihydroxy diphenyl propane. Another group of useful polyhydroxy phenols, that is, phenolic compounds containing multiple phenolic hydroxy groups, are the A or B stage phenol-aldehyde condensates. The phenolic hydroxy groups in the polyhydric phenols can be present on one or more aromatic rings, and the molecules containing them can contain other active hydrogen containing functional groups reactive with oxirane oxygen. Likewise, the polyhydroxy phenols can be chosen for their ability to crosslink among themselves with or without added ingredients, e. g. hexamethylenetetramine, thereby augmenting the thermosetting reaction between the phenols and the epoxy containing polymer.

Certain limitations on the choice of such polyhydroxy phenols are, however, imposed by the practical process requirements. If casting resins are to be produced, the conjugated diene copolymer reaction product has to be mixed with such polyhydroxy phenols before casting and heating. To permit proper mixing and use, the two main ingredients, the conjugated diene copolymer reaction product and the polyhydroxy phenol, should combine to give a liquid, pourable mixture at room or moderately elevated temperature. Therefore, in the case of casting resins, the polyhydroxy phenols should be those liquid at ordinary temperature, those which possess a relatively low melting point to permit mixing at room temperature or at moderately elevated temperature, or those which are soluble in the conjugated diene copolymer-lower aliphatic peracid reaction product. In the case of coating resins, a solvent is invariably used from which the coating is then obtained by evaporation. In this case the polyhydroxy phenols used are those soluble in the solvent from which the coating is to be made.

The amount of polyhydroxy phenol to be used for treating the conjugated diene copolymer-lower aliphatic peracid reaction product depends on the oxirane oxygen content of the conjugated diene copolymer-lower aliphatic peracid reaction product, the particular polyhydroxy phenol used, and the properties desired in the thermoset resinous product. The amount to be used is calculated on the basis of equivalent weights. In cases where full reaction is desired, one equivalent weight of the conjugated diene copolymer-lower aliphatic peracid reaction product, that is, the weight of reaction product containing 16 g. of oxirane oxygen, is treated with one equivalent weight of the polyhydroxy phenol. The equivalent weight of the polyhydroxy phenol is here defined as the molecular weight of the polyhydroxy phenol divided by the number of phenolic hydroxy groups contained in it. The amount of polyhydroxy phenol calculated in this way represents the theoretical amount for complete reaction. For example, if a sample of conjugated diene copolymer-lower aliphatic peracid reaction product is found by analysis to contain 6.6 g. of oxirane oxygen per 100 grams of the reaction product, its equivalent weight will then be $$\frac{100 \times 16}{6.6}$$

or 242 grams. If this product is to be treated with, e. g. resorcinol, calculation shows that the equivalent weight of this polyhydroxy phenol is $$\frac{110}{2}$$

or 55 grams. The theoretical amount of resorcinol to be used with this particular conjugated diene copolymer reaction product would then be $$\frac{55}{242}$$

or 0.226 gram of polyhydroxy phenol per gram of the reaction product.

In accordance with this invention, from 10 to 100% of the calculated theoretical amount of polyhydroxy phenol may be used in the production of the new casting or coating resins of this invention. The amount of reaction between any given conjugated diene copolymer-lower aliphatic peracid reaction product and the polyhydroxy phenol will determine largely its degree of solvent and heat resistances and hardness, and is dependent both on the amount of oxirane oxygen in the conjugated diene copolymer reaction product and the amount of polyhydroxy phenol used.

The following examples will illustrate in some detail the principle of this invention.

*Example 1*

25 g. of a liquid copolymer composed of 70 parts of butadiene and 30 parts of styrene was dissolved in 75 ml. of chloroform. To this solution was added slowly, over a period of 20 minutes, 40.6 g. of 64% perpelargonic acid. This amount of peracid corresponds to about 50% of the stoichiometric amount required for full reaction with the copolymer. During addition of the peracid the temperature was maintained at about 25° C., and following this addition the temperature was raised to about 35° C., at which temperature the reaction was continued for an additional 65 minutes. The reaction batch then was washed free of acid in a slurry of anion exchange resin. The exchange resin employed was IRA-410, a weakly basic amine type anion exchange resin which is produced by The Resinous Products Division of the Rohm and Haas Company, Philadelphia, Pa. Following this the reaction batch was washed free of the exchange resin, dried over magnesium sulfate, and stripped of solvent under reduced pressure. The product was analyzed and found to contain 6.59% of oxirane oxygen.

5 g. of the epoxidized copolymer prepared as described above was dissolved in 50 ml. of chloroform, and to this solution was added 1.13 g. of catechol. This amount of catechol corresponds to about the stoichiometric amount required for full reaction with the epoxidized copolymer. The solution was coated onto a glass plate, dried and baked for 4 hours at 140° C. The baked product was a hard, extremely tough film exhibiting excellent adhesion to the glass.

*Example 2*

500 g. of 70–30 butadiene-styrene copolymer having rubbery properties was dissolved in 500 g. of toluene. To this solution was added 120 g. of formic acid. This solution was stirred, and 462 g. of 50% hydrogen peroxide was added to it over a period of 3 hours, while the temperature was maintained at about 45° C. Following this, the temperature was raised to about 60° C. and maintained at this level for 6 hours to complete the reaction. The amount of hydrogen peroxide employed corresponds to a 10% excess over the amount required fully to epoxidize the copolymer. The reaction batch was washed with water, and stripped of solvent under reduced pressure. Upon analysis it was found to contain 7.92% oxirane oxygen.

10 g. of the epoxidized copolymer prepared as described above was mixed with 0.41 g. of catechol, and introduced into a mold. The amount of catechol employed corresponds to 15% of the amount required for full reaction with the epoxidized copolymer. The mold containing the mixture then was heated for 4 hours at 140° C., and following this the mold and its contents were cooled. The product was removed as a hard, tack-free casting.

*Example 3*

26 g. of a 70–30 butadiene-styrene copolymer having the property of a semi-solid at room temperature, was dissolved in 26 g. of toluene containing an excess of sodium acetate. To this solution was added slowly, over a period of 20 minutes, 91 g. of 40% perbutyric acid. The temperature of the solution during addition of the peracid was maintained at about 35° C., and this temperature was maintained for an additional 2¾ hours. Following this reaction, the reaction batch was washed with a saturated aqueous sodium sulfate solution and with water, dried over magnesium sulfate, and stripped of excess solvent under reduced pressure. The product was analyzed and found to contain 9.2% of oxirane oxygen.

5 g. of the epoxidized copolymer described above was blended with 0.79 g. of catechol, poured into a mold, and baked for 3 hours at 140° C. The amount of catechol employed corresponds to 50% of the stoichiometric amount required for full reaction with the epoxidized copolymer. Following the baking, the mold and its contents were cooled and the product was removed as a hard, tough casting.

*Example 4*

300 g. of a semi-solid copolymer consisting of 73 parts of butadiene and 27 parts of acrylonitrile, was dissolved in 300 g. of toluene. To this solution was added, over a period of 2 hours, 391 g. of 40% peracetic acid, containing 20 g. of sodium acetate and 0.9 g. of dipicolinic acid. This amount of peracetic acid corresponded to about 50% of the amount required fully to epoxidize the copolymer. During addition of the peracid and for 4 hours following this addition the temperature was maintained at about 25° C. The reaction batch then was washed with distilled water and with alkaline aqueous sodium chloride solutions, dried over magnesium sulfate, and stripped of residual solvent under reduced pressure. Upon analysis the product was found to contain 4.79% of oxirane oxygen.

10 g. of the epoxidized copolymer prepared as described above then was dissolved in 90 ml. of benzene, and to this solution was added 2.1 g. of 4,4′-dihydroxy diphenyl propane. This amount of the diphenyl propane corresponds to 60% of the stoichiometric amount required for full reaction with the epoxidized copolymer. The solution then was coated onto a glass slide, dried and baked for 2 hours at 150° C. The film which resulted exhibited excellent flexibility, and a high degree of adhesion to the glass slide.

*Example 5*

200 g. of a semi-solid copolymer consisting of 15 parts of acrylonitrile, 15 parts of isoprene and 70 parts of styrene was dissolved in 600 ml. of toluene. To this solution was added, over a period of one hour, 124 g. of 40% peracetic acid containing 6 g. of sodium acetate and 0.25 g. of dipicolinic acid. This amount of peracetic acid corresponds to a 20% excess over that required stoichiometrically fully to epoxidize the copolymer. During addition of the peracid the temperature was maintained at about 25° C., and following introduction of all the peracid this temperature was maintained for an additional hour and one-half to complete reaction. The reaction batch then was washed with an aqueous sodium chloride solution and subsequently with alkaline aqueous solutions and with distilled water. Following this the reaction batch was dried over magnesium sulfate, and stripped of solvent under reduced pressure. Upon analysis the product was found to contain 2.08% of oxirane oxygen.

10 g. of the epoxidized copolymer prepared by the above procedure was then dissolved in 90 ml. of benzene, and 1.5 g. of Bakelite BR–254 was dissolved in this solution. The Bakelite BR–254 is a 100% para-phenyl-phenolic oil soluble resin, formed by reaction of para-phenyl-phenol with formaldehyde and is produced by The Bakelite Division, Union Carbide and Carbon Corporation, 30 East 42nd Street, New York 17, N. Y. This amount of the BR–254 corresponds to the stoichiometric amount required for full reaction with the epoxidized copolymer. This solution was coated onto a glass plate, dried and baked for one hour at 150° C. The film which resulted showed excellent toughness and a high degree of adhesion to the glass plate.

*Example 6*

100 g. of a liquid copolymer of 70 parts of butadiene and 30 parts of styrene was dissolved in 600 g. of toluene. To this was added slowly, over a period of 20 minutes, 360 g. of 40% peracetic acid. This amount of peracid corresponds to a 50% excess over the stoichiometric amount required fully to epoxidize the copolymer. During addition of the peracid the temperature was maintained at 25° C., and following introduction of the peracid the temperature was raised to about 50° C. where it was held for an additional hour. The reaction batch then was washed with water, and subsequently with an aqueous alkaline sodium chloride solution, was dried over magnesium sulfate, and was stripped of solvent under reduced pressure. Upon analysis the end product was found to contain 7.16% of oxirane oxygen.

10 g. of the epoxidized copolymer prepared as described above was dissolved in 90 ml. of toluene, and to this solution was added 2.46 g. of resorcinol. This amount of resorcinol corresponds to about the stoichiometric amount required for full reaction with the epoxidized copolymer. This solution then was coated onto a glass slide, dried and baked for 1 hour at 150° C. The resulting film was a tough, hard product which exhibited a high degree of adhesion to the glass slide.

*Example 7*

10 g. of the epoxidized copolymer described in Example 6 was dissolved in 90 ml. of toluene, and to this solution was added 2.46 g. of hydroquinone. This amount of hydroquinone corresponds to about the stoichiometric amount required for full reaction with the epoxidized copolymer. This solution then was coated onto a glass plate, dried and baked for 1 hour at 150° C. The resulting film was tough and hard, and exhibited excellent adhesion to the glass plate.

Example 8

10.6 g. of a liquid copolymer of 70 parts of butadiene and 30 parts of styrene was dissolved in 60 g. of toluene. To this was added over a period of 10 minutes, 8 g. of 40% peracetic acid. This amount of peracid corresponds to about 30% of the stoichiometric amount required fully to epoxidize the copolymer. During addition of the peracid the temperature was maintained at about 25° C., and following introduction of the peracid the temperature was raised to about 50° C. and maintained at this level for an additional hour. The mixture was washed free of acid with aqueous alkaline sodium chloride solutions, dried over magnesium sulfate and stripped of solvent under reduced pressure. Upon analysis the product was found to contain 4.68 g. of oxirane oxygen.

10 g. of the epoxidized copolymer prepared as described above was dissolved in 10 ml. of toluene, and to this solution was added 1.6 g. of resorcinol. This amount of resorcinol corresponds to about the stoichiometric amount required for full reaction with the epoxidized copolymer. The solution was poured into a small aluminum cup, the solvent evaporated and the residue in the cup baked at 150° C. for 2 hours. The cup and its contents were cooled, and the product removed from the cup as a tough, resilient casting.

What is claimed is:

1. Thermosetting, organic solvent soluble composition useful in the preparation of thermoset resinous products, said composition comprising (a) an epoxidized copolymer containing at least 1% of oxirane oxygen, said epoxidized copolymer being the reaction product of a lower aliphatic peracid having 1 to 10 carbon atoms with a copolymer having a molecular weight of 250 to 250,000 of a conjugated diene and an ethylenic monomer containing the $CH_2=CH-$ group; and (b) a polyhydric phenol, said polyhydric phenol being present in an amount of 10% to 100% of the stoichiometric amount required for complete reaction with the oxirane oxygen in said epoxidized copolymer.

2. Thermosetting, organic solvent soluble composition useful in the preparation of thermoset resinous products, said composition comprising (a) an epoxidized copolymer containing at least 1% of oxirane oxygen, said epoxidized copolymer being the reaction product of performic acid with a copolymer having a molecular weight of 250 to 250,000 of a conjugated diene and an ethylenic monomer containing the $CH_2=CH-$ group; and (b) a polyhydric phenol, said polyhydric phenol being present in an amount of 10% to 100% of the stoichiometric amount required for complete reaction with the oxirane oxygen in said epoxidized copolymer.

3. Thermosetting, organic solvent soluble composition useful in the preparation of thermoset resinous products, said composition comprising (a) an epoxidized copolymer containing at least 1% of oxirane oxygen, said epoxidized copolymer being the reaction product of peracetic acid with a copolymer having a molecular weight of 250 to 250,000 of a conjugated diene and an ethylenic monomer containing the $CH_2=CH-$ group; and (b) a polyhydric phenol, said polyhydric phenol being present in an amount of 10% to 100% of the stoichiometric amount required for complete reaction with the oxirane oxygen in said epoxidized copolymer.

4. Thermosetting, organic solvent soluble composition useful in the preparation of thermoset resinous products, said composition comprising (a) an epoxidized copolymer containing at least 1% of oxirane oxygen, said epoxidized copolymer being the reaction product of perpropionic acid with a copolymer having a molecular weight of 250 to 250,000 of a conjugated diene and an ethylenic monomer containing the $CH_2=CH-$ group; and (b) a polyhydric phenol, said polyhydric phenol being present in an amount of 10% to 100% of the stoichiometric amount required for complete reaction with the oxirane oxygen in said epoxidized copolymer.

5. Thermosetting, organic solvent soluble composition useful in the preparation of thermoset resinous products, said composition comprising (a) an epoxidized copolymer containing at least 1% of oxirane oxygen, said epoxidized copolymer being the reaction product of perbutyric acid with a copolymer having a molecular weight of 250 to 250,000 of a conjugated diene and an ethylenic monomer containing the $CH_2=CH-$ group; and (b) a polyhydric phenol, said polyhydric phenol being present in an amount of 10% to 100% of the stoichiometric amount required for complete reaction with the oxirane oxygen in said epoxidized copolymer.

6. Thermosetting, organic solvent soluble composition useful in the preparation of thermoset resinous products, said composition comprising (a) an epoxidized copolymer containing at least 1% of oxirane oxygen, said epoxidized copolymer being the reaction product of a lower aliphatic peracid having 1 to 10 carbon atoms with a copolymer having a molecular weight of 250 to 250,000 of a conjugated diene and an ethylenic monomer containing the $CH_2=CH-$ group; and (b) an uncured phenol-aldehyde condensate, said condensate being present in an amount of 10% to 100% of the stoichiometric amount required for complete reaction with the oxirane oxygen in said epoxidized copolymer.

7. Thermosetting, organic solvent soluble composition useful in the preparation of thermoset resinous products, said composition comprising (a) an epoxidized copolymer containing at least 1% of oxirane oxygen, said epoxidized copolymer being the reaction product of a lower aliphatic peracid having 1 to 10 carbon atoms with a copolymer having a molecular weight of 250 to 250,000 of a conjugated diene and an ethylenic monomer containing the $CH_2=CH-$ group; and (b) a bisphenol, said bisphenol being present in an amount of 10% to 100% of the stoichiometric amount required for complete reaction with the oxirane oxygen in said epoxidized copolymer.

8. Thermosetting, organic solvent soluble composition useful in the preparation of thermoset resinous products, said composition comprising (a) an epoxidized copolymer containing at least 1% of oxirane oxygen, said epoxidized copolymer being the reaction product of a lower aliphatic peracid having 1 to 10 carbon atoms with a copolymer having a molecular weight of 250 to 250,000 of a conjugated diene and an ethylenic monomer containing the $CH_2=CH-$ group; and (b) resorcinol, said resorcinol being present in an amount of 10% to 100% of the stoichiometric amount required for complete reaction with the oxirane oxygen in said epoxidized copolymer.

9. Thermosetting, organic solvent soluble composition useful in the preparation of thermoset resinous products, said composition comprising (a) an epoxidized copolymer containing at least 1% of oxirane oxygen, said epoxidized copolymer being the reaction product of a lower aliphatic peracid having 1 to 10 carbon atoms with a copolymer having a molecular weight of 250 to 250,000 of a conjugated diene and an ethylenic monomer containing the $CH_2=CH-$ group; and (b) hydroquinone, said hydroquinone being present in an amount of 10% to 100% of the stoichiometric amount required for complete reaction with the oxirane oxygen in said epoxidized copolymer.

10. Thermosetting, organic solvent soluble composition useful in the preparation of thermoset resinous products, said composition comprising (a) an epoxidized copolymer containing at least 1% of oxirane oxygen, said epoxidized copolymer being the reaction product of a lower aliphatic peracid having 1 to 10 carbon atoms with a copolymer having a molecular weight of 250 to 250,000 of a conjugated diene and an ethylenic monomer containing the $CH_2=CH-$ group; and (b) catechol, said catechol being present in an amount of 10% to 100% of the stoichiometric amount required for complete reaction with the oxirane oxygen in said epoxidized copolymer.

11. Thermosetting, organic solvent soluble composition useful in the preparation of thermoset resinous products, said composition comprising (a) an epoxidized copolymer containing at least 1% of oxirane oxygen, said epoxidized copolymer being the reaction product of a lower aliphatic peracid having 1 to 10 carbon atoms with a copolymer having a molecular weight of 250 to 10,000 of a conjugated diene and an ethylenic monomer containing the $CH_2=CH-$ group; and (b) a polyhydric phenol, said polyhydric phenol being present in an amount of 10% to 100% of the stoichiometric amount required for complete reaction with the oxirane oxygen in said epoxidized copolymer.

12. Thermoset resinous product prepared from the composition of claim 1.

13. Thermoset resinous product prepared from the composition of claim 11 by heating said composition until a thermoset resinous product is produced.

References Cited in the file of this patent

UNITED STATES PATENTS

| | | |
|---|---|---|
| 2,528,360 | Greenlee | Oct. 31, 1950 |
| 2,660,563 | Banes et al. | Nov. 24, 1953 |